Aug. 26, 1958     R. C. FERGASON     2,848,860
COTTON PICKING SPINDLE
Original Filed Sept. 10, 1949
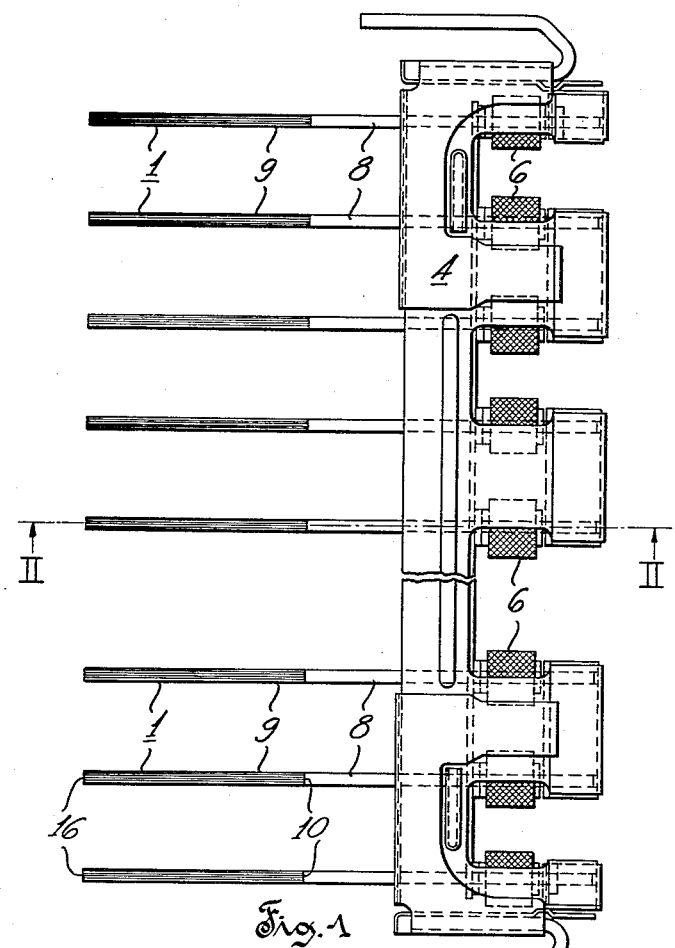
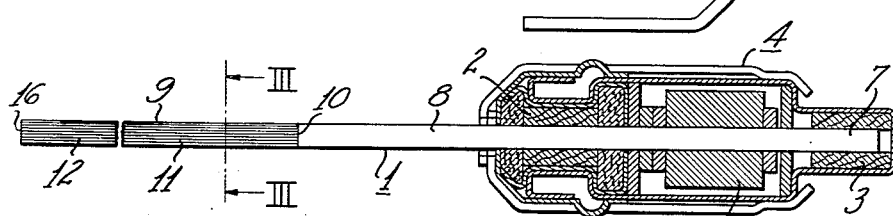
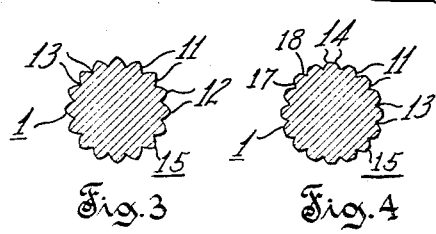
Inventor
Rector R. Fergason
by
Attorney United States Patent Office 2,848,860
Patented Aug. 26, 1958

2,848,860

COTTON PICKING SPINDLE

Rector C. Fergason, Gadsden, Ala., assignor to Allis-Chalmers Manufacturing Company, Milwaukee, Wis.

Original application September 10, 1949, Serial No. 114,969, now Patent No. 2,671,298, dated March 9, 1954. Divided and this application February 12, 1954, Serial No. 409,875

8 Claims. (Cl. 56—50)

This invention relates to cotton harvesting apparatus and more particularly to cotton picking spindles of the rotatably mounted type. The present application is a division of application Serial No. 114,969 filed on September 10, 1949, for Cotton Picker.

This invention is more particularly concerned with improving a picking spindle of the type designed to be rotatably mounted in a traveling carrier such as a slat for coaction with a driving mechanism operative to rotate the spindle during the interval the active portion of the spindle is disposed in picking relation to a plant row, and for coaction with a stripping mechanism operative to remove picked cotton from a nonrotating spindle. In such apparatus, the active or boll engaging portion of the spindle should be constructed to aggressively wrap the cotton therearound and yet permit the wrapped cotton to be readily pulled or stripped longitudinally from the spindle without tearing or breaking the cotton fibers. In addition, it is highly desirable that the picking portion of the spindle be designed so as to have a maximum or aggressiveness or cotton wrapping qualities, to promote cotton picking, and a minimum of gum and pitch collecting tendencies. In addition, it has been found that aggressive wrapping action is enhanced by adequately moistening the boll engaging portion of the spindle.

Heretofore much difficulty has been experienced in obtaining a satisfactory spindle structure since the provision of a barbed wrapping or active portion presents a serious stripping problem necessitating the use of spindles having a tapered active portion and the use of a more complicated stripping mechanism, all of which increased the initial cost. Moreover, maintenance costs are also increased as it is impractical to recondition a barbed, tapered spindle structure when the barbs become dull or broken. Consequently, a spindle thus rendered ineffective usually must be removed and replaced by a new spindle. Further, it has been found very difficult to moisten the surface of such a spindle sufficiently to improve its cotton wrapping action without excessively wetting the cotton and thus reducing its value.

Difficulty has also been experienced in obtaining satisfactory operation with a spindle structure presenting a roughened cylindrical picking surface since the roughened surface soon wears smooth and becomes ineffective. In fact, the use of such spindles necessitates the provision of a special means for reroughening the active surface portion of each spindle just prior to its being presented in picking relation to the plant row. The provision of abrasive wheels or disks has not proved satisfactory since an abrasive surface is soon clogged with gum and pitch which obviously reduces roughening efficiency.

Reroughening mechanisms as heretofore employed have produced a scratched surface in which the scratches run transversely of the spindle. Obviously this practice makes stripping more difficult because the cotton is slid longitudinally of the spindle in the stripping process. Also, wear due to frequent reroughening of the cylindrical surface soon results in the formation of a tapered picking portion which obviously weakens the spindle and reduces effectiveness of the stripping mechanism. In addition, the problem of moistening the relatively smooth picking surface without supplying an excess of liquid is fully as difficult with this type of construction as it is with the barbed, tapered construction previously mentioned.

In actual practice, the barbed spindle has a tendency to rasp or claw the surface of the cotton plant and its foliage thus damaging the green or unopened bolls and increasing the amount of trash and foreign material such as leaves and bark which is present in the picked cotton. This trash creating characteristic of the barbed spindle also tends to increase the amount of gum or pitch which can be picked up by the cotton bolls and which is present to coat the surface of the spindles thus decreasing picking efficiency.

In accordance with the present invention, the aforementioned difficulties and defects are satisfactorily eliminated or minimized by the provision of a spindle having an active portion specially fluted to afford an aggressive wrapping action without necessitating the use of special mechanism for roughening or sharpening the fluted surface.

A further object of this invention is to provide a spindle which may be efficiently stripped of cotton with the conventional shoe type stripper.

Another object of this invention is to provide a spindle which has longer effective life without the need of periodic reconditioning or resharpening.

Another object of the present invention is to provide a spindle which has a minimum of trash creating characteristics.

Another object of this invention is to provide a spindle from which the wrapped cotton may be easily stripped without tearing of the cotton fibers and which will still have an aggressive cotton wrapping surface.

Accordingly, this invention may be considered as comprising those features of construction and coaction hereinafter more fully set forth in the following detailed description and appended claims, reference being had to the accompanying drawing wherein:

Fig. 1 is a side view of a slat structure mounting a series of spindles constructed in accordance with the present invention;

Fig. 2 is an enlarged fragmentary sectional view on line II—II of Fig. 1, showing one of the spindles at somewhat less than full length;

Fig. 3 is an enlarged cross sectional view taken on line III—III of Fig. 2; and

Fig. 4 is a cross sectional view similar to Fig. 3 and illustrating a condition of wear at the picking portion of the spindle.

Referring to Figs. 1 and 2, a series of picking spindle rods each designated by the reference character 1 are rotatably supported by means of front and rear bearings 2 and 3, respectively, on a slat structure 4. In conformity with conventional practice, a number of slates 4 are affixed to and supported by upper and lower endless belts or chains (not shown), for travel in an elliptical path. Movement of the slats along the elliptical path carries the spindle rods past a moistening mechanism and then through the cotton plants where the picking occurs and then through a stationary stripper shoe assembly where the cotton is stripped from the spindle rods 1, all of which is well known in the art.

Further details of the spindle mounting slats and of the drive mechanism therefor may be found by reference to my copending allowed application Serial Number 114,969, filed on September 10, 1949, now U. S. Patent No. 2,671,298, issued March 9, 1954.

The spindle rod 1 shown in Fig. 2 forms an elongated cylindrical element of substantially uniform diameter throughout its length. In addition to the rod 1, each spindle includes a separately formed cylindrical drive part 6 which is nonrotatably secured in axially fixed position to the rod 1 adjacent to but at some axial distance from one end of the latter. Portions of the rod 1 which extend axially from opposite sides of the drive part 6 present smooth cylindrical surfaces 7 and 8, respectively, by means of which the spindle is rotatably mounted in the bearings 3 and 2.

The part of the spindle rod 1 which extends from the slat structure 4 at the picking side of the latter, that is, toward the left in Figs. 1 and 2, includes part of the smooth cylindrical surface 8 and an active or picking portion 9 which merges with the smooth cylindrical surface 8 at an intermediate portion 10 of the spindle and terminates at the picking end 16 of the latter. The peripheral portion 15 of active portion 9 is defined by surfaces 12 and is of substantially the same diameter as the smooth cylindrical surface 8, and a circumferential series of longitudinally extending ribs 11 provide a multiplicity of similar minute flutes 13 which are formed in the active portion 9 of the spindle and extend longitudinally outward from the intermediate portion 10 to the picking end 16. These straight longitudinally extending flutes 13 permit cotton to readily slide longitudinally along the active portion 9 of the spindle 1 when being stripped, without tearing the cotton fiber. In addition, there is very little or no tendency for the cotton fibers to cling or remain on the spindle because in stripping, the cotton is slid longitudinally along outwardly diverging side walls 17 and 18 which define the flutes and does not contact any rough or friction increasing surfaces to thus reduce stripping efficiency.

With reference to Fig. 3, it will be noted that the minute flutes 13 are closely and uniformly spaced circumferentially of the spindle rod 1. The ribs 11 between the flutes 13 each present side walls 17 and 18 which merge with a line like longitudinally extending gripping and supporting edge 12, and the radial height of the ribs 11, or the radial extent of the flutes 13 is such that the gripping or cotton engaging edges 12 generally form longitudinal line like extensions or surface continuations of the smooth cylindrical spindle surface 8. As shown in Fig. 3, each rib 11 has a pointed arch, cross sectional configuration.

The herein disclosed fluted spindle construction increases the effective moisture retaining surface of the spindle by providing minute, moisture retaining recesses in the periphery of a generally cylindrical spindle, the depth of the recesses in proportion to the diameter of the spindle being sufficiently small so as to preserve a generally circular cross sectional configuration of the spindle. Specifically, the spindle comprises a generally cylindrical, narrow, elongated member having a circumferential series of closely spaced, longitudinal ribs thereon, said ribs having a pointed arch, cross sectional configuration and defining minute, moisture retaining interspaces therebetween, or minute channel-like reservoirs for holding moisture. The spindle so constructed holds effectively an amount of water adequate to insure the efficient wrapping of cotton lint without retaining an amount sufficient to excessively wet the cotton and thus reduce its grade. The spindle, when in picking relation to cotton, rotates rapidly on its axis, and centrifugal force tends to urge the water outward to the line like gripping edges 12 of the ribs 11 where it is in the best possible position to contact the cotton lint and aid in the wrapping and picking thereof. The slight pressure created by the contact of the spindle with the cotton boll aids the aggressiveness achieved by the moistened line like gripping edges 12 of the ribs 11 and causes the cottom to adhere to and be wrapped about active portion 9 of spindle 1. The cotton initially wound upon the spindle is packed into the minute flutes 13 by the compression force resulting from continued wrapping of the cotton. The cotton, when wrapped as described above, will not allow the spindle to free wheel inside the boll of cotton but will become tightly affixed to the fluted active part 9 of the spindle and will remain upon the spindle 1 when it is withdrawn from the cotton plant.

After the cotton is picked, it is removed from the spindles 1 by passing the spindles through a stationary comb like stripper assembly as is well known in the art. These strippers cause the fluted active portion 9 of the spindle to wear as shown in Fig. 4. It will be noted that such wear creates two cotton lint gripping edges 14 on each rib 11 in place of one gripping edge 12 which has been worn away. It is obvious that these line like edges will be maintained by wear action thus maintaining the aggressiveness of the spindle.

In the embodiment of the invention as illustrated by Fig. 3 spindle 1 has 16 flutes, and the circumferential width of the base of each rib 11 or pointed arch rib is somewhat larger than the radial height of such arch. For practical purposes it is desirable that the circumferential width of the rib base be at least equal to the radial height of the rib, that is, to the radial extent of the associated flute.

It should be understood that it is not intended to limit the invention to the particular forms and details described hereinabove, and that the invention includes such other forms and modifications as are embraced by the scope of the appended claims.

It is claimed and desired to secure by Letters Patent:

1. A cotton picking spindle comprising a generally cylindrical, narrow elongated member having a circumferential series of closely spaced longitudinal ribs thereon, said ribs having a pointed arch, cross sectional configuration.

2. A cotton picking spindle comprising a narrow elongated cylindrical rod having a circumferential series of uniformly spaced longitudinally extending ribs forming a picking portion of generally circular cross section on said rod, said ribs having a pointed arch, cross sectional configuration, and defining minute, moisture retaining interspaces therebetween.

3. A cotton picking spindle for use in a mobile harvester unit having a traveling spindle carrier and means for rotatably mounting spindles in said carrier, said spindle comprising an elongated cylindrical element of substantially uniform diameter throughout its length, a drive part on said element adjacent one end thereof, said element presenting an active portion having a circumferential series of closely spaced ribs thereon which extend longitudinally outward from a portion of said element intermediate its ends to the other end of said element, said ribs having a cross sectional configuration presenting narrow parallel gripping edges which are separated from each other by a minute channel like reservoir and which form longitudinal line like extensions of the cylindrical surface of said element.

4. A cotton picking spindle for use in a mobile harvester unit having a traveling spindle carrier and means for rotating spindles mounted in said carrier, said spindle comprising an elongated cylindrical element of substantially uniform diameter throughout its length, a drive part on said element adjacent one end thereof, said element presenting an active portion having formed therein a multiplicity of similar minute ribs which extend longitudinally outward for a portion of said element intermediate its ends to the other end of said element, said ribs having a pointed arch, cross sectional configuration presenting parallel line like gripping edges closely spaced circumferentially which form longitudinal extensions of the cylindrical surfaces of said element and which are separated from each other by minute channel like reservoirs.

5. A cotton picking spindle for use in a mobile harvester unit having a traveling spindle carrier and means for rotating spindles mounted in said carrier, said spindle comprising an elongated cylindrical element of substantially uniform diameter throughout its length, a drive part on said element adjacent one end thereof, said element presenting an active portion having formed therein a multiplicity of similar minute ribs which extend longitudinally outward from a portion of said element intermediate its ends to the other end of said element, said ribs having a pointed arch, cross sectional configuration wherein the points of the arches present parallel line like gripping edges, which are separated from each other by minute channel like reservoirs and wherein the circumferential width of the base of each arch at least equals the radial extent of such arch.

6. A cotton picking spindle for use in a mobile harvesting unit having a traveling spindle carrier, said spindle comprising an elongated cylindrical element presenting a smooth portion merging with an active portion of substantially the same circular cross section as said smooth portion, said active portion extending outward from said smooth portion to an end of said element and having formed therein a multiplicity of similar minute ribs extending longitudinally outward from said smooth portion to said end of said element, said ribs having a pointed arch, cross sectional configuration wherein the points of the arches present parallel line like gripping edges forming longitudinal extensions of the cylindrical surface of said smooth portion, said edges defining channel like reservoirs therebetween and wherein the circumferential width of the base of each arch at least equals the radial extent of such arch.

7. A cotton picking spindle for use in a mobile harvesting unit having a traveling spindle carrier, said spindle comprising an elongated cylindrical element presenting a smooth portion merging with an active portion of substantially the same circular cross section as said smooth portion, said active portion extending outward from said smooth portion to an end of said element and having formed therein a multiplicity of similar minute flutes extending longitudinally outward from said smooth portion to said end of said element, the ribs between said flutes each having a cross sectional configuration presenting narrow parallel gripping edges forming longitudinal extensions of said smooth portion, and the circumferential width of the base of each rib being at least equal to the radial extent thereof.

8. A cotton picking spindle comprising an elongated rod having a generally cylindrical active portion, said active portion having a circumferential series of minute flutes in the surface thereof which flutes extend longitudinally of said spindle to provide moisture retaining indentations, and enable the cotton to be readily stripped longitudinally from said active portion without tearing of cotton fibers.

References Cited in the file of this patent

UNITED STATES PATENTS

| | | |
|---|---|---|
| 345,312 | Mason | July 13, 1886 |
| 372,919 | Langley | Nov. 8, 1887 |
| 464,852 | Canuteson | Dec. 8, 1891 |
| 685,439 | Campbell | Oct. 29, 1901 |
| 1,059,478 | Lispenard | Apr. 22, 1913 |
| 1,668,247 | Morava | May 1, 1928 |
| 2,109,506 | Rust | Mar. 1, 1938 |
| 2,162,750 | Rust | June 20, 1939 |
| 2,484,319 | Sperry | Oct. 11, 1949 |
| 2,645,892 | Weems | July 21, 1953 |
| 2,672,720 | Smith | Mar. 23, 1954 |